United States Patent [19]

Doremus

[11] Patent Number: 5,398,797
[45] Date of Patent: Mar. 21, 1995

[54] DECLUTCHING DEVICE HAVING AN HYDRAULIC ACTUATOR FOR SNAP-FITTING ON A CLUTCH OF THE PULL-OFF TYPE

[75] Inventor: Olivier Doremus, Noyelle Vion, France

[73] Assignee: Valeo, Paris, France

[21] Appl. No.: 187,895

[22] Filed: Jan. 28, 1994

[30] Foreign Application Priority Data

Jan. 29, 1993 [FR] France ............................ 93 00935

[51] Int. Cl.6 .............................................. F16D 25/08
[52] U.S. Cl. ................. 192/85 CA; 192/98; 192/110 B
[58] Field of Search ........... 192/85 CA, 85 C, 98, 192/89.24, 110 B, 101

[56] References Cited

U.S. PATENT DOCUMENTS

| 4,399,898 | 8/1983 | Olschewski et al. | 192/85 CA X |
| 4,632,237 | 12/1986 | Maycock et al. | 192/101 X |
| 4,778,039 | 10/1988 | Eliasson | 192/85 CA |
| 5,014,840 | 5/1991 | Tojima | 192/98 |

FOREIGN PATENT DOCUMENTS

| 204663 | 12/1986 | European Pat. Off. | 192/85 CA |
| 2304826 | 10/1976 | France. | |
| 2651846 | 3/1991 | France. | |
| 2653195 | 4/1991 | France. | |
| 2915989 | 10/1980 | Germany. | |
| 2944648 | 5/1981 | Germany. | |
| 3044048 | 7/1982 | Germany. | |
| 3051174 | 12/1991 | Germany. | |
| 2088010 | 6/1982 | United Kingdom. | |
| 8701773 | 3/1987 | WIPO. | |

*Primary Examiner*—Andrea L. Pitts
*Attorney, Agent, or Firm*—Longacre & White

[57] ABSTRACT

A declutching device comprises an hydraulic actuator, a preloading spring which permanently bias the movable member of the hydraulic actuator towards its retracted position with respect to the fixed member of the actuator, and a retaining element for retaining the movable member in its extended position with respect to the fixed member. The retaining element comprises a locking ring which is held under precompression in a groove formed in the movable member of the actuator, while another groove, with a stepped base, is formed in the fixed member of the actuator. The base of this latter groove comprises at least two steps, offset axially from each other and having different diameters, namely a first step for holding the locking ring at least partially engaged in the groove of the movable member, and a step which is adapted to enable it to escape automatically from this groove.

5 Claims, 1 Drawing Sheet

DECLUTCHING DEVICE HAVING AN HYDRAULIC ACTUATOR FOR SNAP-FITTING ON A CLUTCH OF THE PULL-OFF TYPE

FIELD OF THE INVENTION

This invention relates in general terms to the assembly of a declutching device on to a clutch of the pull-off type when the said declutching device employs an hydraulic actuator, that is to say when it comprises two members, namely a fixed member and a movable member in piston and cylinder relationship with each other for sliding movement of the movable member along a cylindrical interface surface of the fixed member, the two said members defining a control chamber between them, and with a clutch release bearing coupled to the movable member for acting in traction on the declutching means of the clutch.

More particularly, the invention is concerned with the case where, in terms of a clutch assembly for a motor vehicle, assembly of the declutching device to the clutch is carried out by snap-fitting while two units are moved axially towards each other, one of these units comprising the engine of the vehicle together with the clutch, while the other unit comprises the gearbox of the vehicle together with the declutching device. In this case, the clutch, or more precisely its declutching means (such as a diaphragm) is typically provided for this purpose with a thrust means for engagement with the clutch release bearing of the declutching device through an appropriate coupling member.

BACKGROUND OF THE INVENTION

The problem that arises in this connection is that, in order that the clutch release bearing may be brought into engagement with the above mentioned thrust means of the clutch during assembly, the movable member of the actuator which carries the clutch release bearing must be in a position in which it is extended or projecting from the fixed member of the actuator; but, in order for the clutch release bearing to be in permanent engagement against the said thrust means in service through the coupling member, preloading means are also provided for, by contrast, biassing the movable member of the actuator permanently towards its retracted position with respect to the fixed member.

Accordingly, during assembly, the movable member of the hydraulic actuator first has to be put into its extended position and retained in that position, from which it subsequently has to be released. In other words, it is necessary to provide retaining means which are adapted to retain the movable member in its extended position for so long as this is required.

In the specification of French published patent application FR 2 651 846A, these retaining means comprise a retractable abutment element which, under control, provides an engagement means for the movable member of the hydraulic actuator at the rear of the latter. In order that this retractable abutment element can be effaced so that the movable member of the hydraulic actuator can be released from its extended position, a specific additional action on the retractable abutment element is necessary, and this complicates the assembly operations.

Such a retractable abutment element also increases quite substantially the radial size of the whole assembly, and it is also relatively complicated and costly to manufacture. In addition, because the abutment element gives the movable member of the hydraulic actuator a rigid mechanical abutment point, it is liable to give rise to damage of either the fixed or the movable member of the actuator when in use, if the axial thrust exerted in order to achieve the required snap-fitting action is too great.

Finally, since in practice there is no check as to whether the required snap-fitting engagement has indeed been achieved, it is possible that the retractable abutment element can be accidentally effaced, even when the snap-fitting has for some reason or other not been effected. Once this error becomes apparent, the operations have to be started all over again, and the movable member of the hydraulic actuator has to be restored to its extended position.

However, it can happen that this fault may just as easily pass unnoticed, so that the clutch is then subsequently unable to be disengaged.

DISCUSSION OF THE INVENTION

An object of the invention is to provide a declutching device which will avoid the above mentioned drawbacks.

According to the invention, a declutching device for snap-fitting attachment on a clutch of the pull-off type, the declutching device being of the type comprising: an hydraulic actuator, which itself comprises two members, one of which is fixed and the other movable, defining between them a control chamber, the said members being in piston and cylinder relationship with respect to each other along a cylindrical surface of the said fixed member; preloading means which permanently bias the said movable member of the hydraulic actuator towards its retracted position with respect to the said fixed member; and retaining means for retaining the said movable member in its extended position, is characterised in that the said retaining means comprise a locking ring which is resiliently deformable radially, the said locking ring being disposed in a groove in the said movable member, under precompression such as to cause the locking ring to tend to escape radially from the said groove, and in that the said cylindrical surface of the fixed member is formed with a recessed groove corresponding to the said groove, the said recessed groove having a stepped base which comprises at least two steps of different diameters offset axially from each other, namely a first or retention step defining, from the said cylindrical surface, a free radial depth smaller than the thickness of the retaining ring, and a second or release step defining, from the said cylindrical surface, a free radial depth which is at least equal to the said thickness.

During the assembly operation, the locking ring is aligned with the retention step in the base of the groove formed in the fixed member of the actuator. This retention step then retains the locking ring in engagement with the groove in the movable member, thus ensuring that the latter is held in its extended position.

After the primary and secondary units have been moved axially towards each other far enough to achieve the required snap-fitting, they are then momentarily moved slightly away from each other axially. Then, if the required snap-fitting action has been achieved effectively, the clutch release bearing of the declutching device is driven by the clutch, and, with it, the movable member of the hydraulic actuator and therefore the locking ring which has up to that point retained it in its extended position. When the locking ring then lies in line with the release step in the base of the groove in the fixed member of the hydraulic actuator, it escapes automatically, due to its own precompression, into the groove in the movable member. The latter is then released from its extended position and is free to slide along the fixed member as required.

Thus, in an arrangement in accordance with the invention, release of the movable member of the hydraulic actuator has the advantage that it is obtained systematically during the assembly operation without any specific further operation being required for this purpose. In addition, this release of the movable member has the further advantage that it is achieved by a positive, sharp action, and then only after correct snap-fitting has been achieved. This has the advantage that it provides a clear and positive confirmation that the declutching device is properly snap-fitted on to the clutch.

In this connection, the invention also embraces the method of commissioning the declutching device consisting in applying to it a momentary relative axial movement away from the clutch, after a relative axial movement of the declutching device and the clutch towards and into engagement with each other.

In addition, the declutching device in accordance with the invention is preferably adapted so that it can be re-used after any disassembly of the clutch release bearing which is part of the declutching device, when, for maintenance reasons for example, any such disassembly has to be carried out.

Finally, it has the advantage that the movable member of the hydraulic actuator can if desired by fitted with a protective sock.

The various features and advantages of the invention will appear more clearly on a reading of the detailed description of a preferred embodiment of the invention which follows, and which is given by way of example only and with reference to the accompanying diagrammatic drawings.

DESCRIPTION OF A PREFERRED EMBODIMENT OF THE INVENTION

Figure 1:
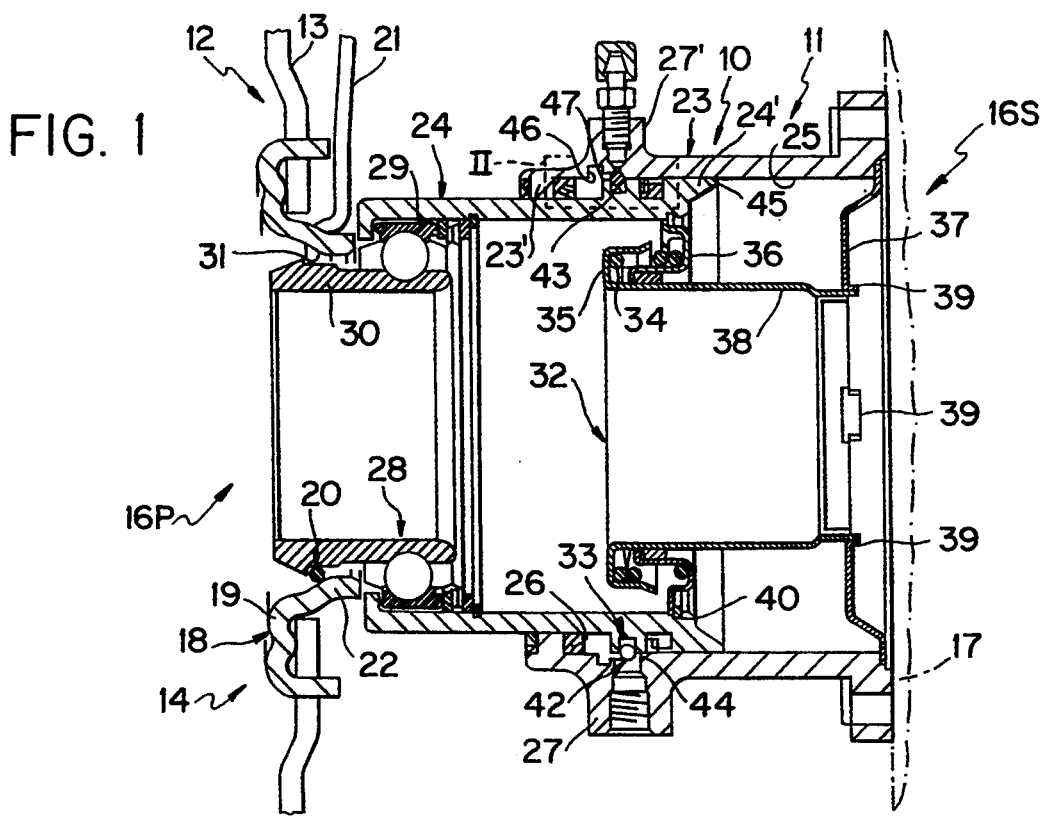
FIG. 1 is a view in axial cross section showing a declutching device in accordance with the invention, with the movable member of its hydraulic actuator in its withdrawn or extended position.

As is shown in FIG. 1, a declutching device 10 is snap-fitted on a clutch 12 of the pull-off type. The purpose of the arrangement to be described is to facilitate this snap-fitting. The declutching device 10 has an hydraulic actuator 11. The clutch 12 has a declutching means 13, in this example a diaphragm, which, for the purposes of its engagement (through the said snap-fitting) with the declutching device 10, is provided with thrust means 14.

The clutch 12 is typically a motor vehicle clutch, and this description will be given in the context of a motor vehicle clutch, by way of example only. The engine of the vehicle, together with the clutch 12, constitute a first unit 16P, or primary unit. Similarly the gearbox of the vehicle, together with the declutching device 10, constitute a second unit 16S, or secondary unit. In this connection the declutching device 10 is secured on the casing 17 of the gearbox, for example by means of threaded fasteners not shown. Thus the snap-fitting connection mentioned above is made during assembly, that is to say while relative axial movement is being carried out to bring the two units 16P and 16S together.

In the present example the thrust means 14 of the clutch 12 includes, in a known manner, a thrust element 18 having a corrugated or beaded portion 19. The thrust element 18 bears through this beaded portion on the diaphragm 13, on the side of the latter opposite to the declutching device 10. The thrust means 14 also includes a coupling member 20, whereby the declutching device 10 is able to exert a tractive force on the thrust element 18. In the present case this coupling member 20 is in the form of a coupling ring which is discontinuous, having a slot, the ring being extended by generally radial arms 20 extending on either side of this slot. The coupling ring 20 is resiliently deformable radially, and bears on a generally frusto-conical portion 22 of the thrust element 18, on the side of the latter opposite to the declutching device 10. For more detail as to such a thrust means 14, reference may for example be made to United States patent specification No. 5 113 989 and the corresponding French published patent specification FR 2 653 195A.

The hydraulic actuator 11 of the declutching device 10 in the present case comprises a fixed member 23 and a movable member 2.4 arranged in piston and cylinder relationship with each other, for sliding movement of the movable member 24 with respect to the fixed member 23 along a cylindrical surface 25 of the fixed member 23. At its outer or left hand end (in FIG. 1) the fixed member 23 has an inwardly directed terminal radial flange 23'. Similarly, at its right hand end in FIG. 1, or inner end, within the fixed member 23, the movable member 2.4 has an outwardly directed radial flange 24'. These two radial flanges define between them a sealed control chamber 26, which is supplied with hydraulic fluid through at least one fluid connection 27, 27'. In the example shown, there are two of these fluid connections, the connection 27 being a feed connection and the connection 27' a purge connection.

As shown in FIG. 1, the fixed member 23 of the hydraulic actuator 11 is the outermost member of the latter, with the movable member 24 displaceable within it, so that here the cylindrical surface 25 is an internal bore of the fixed member 23. It will of course be understood that the cylindrical interface surface along which the movable member slides may be an outer surface of the fixed member 23, with the latter extending within the movable member; in that case the radial directions of the flanges 23' and 24' will of course be reversed.

The fixed member 23 of the actuator has a terminal flange, shown in FIG. 1, by which it, and therefore the hydraulic actuator 11 as a whole, is secured to the gearbox casing 17. In all cases it will be noted that the control chamber 26 is defined not only by the flanges 23' and 24', but also by part of the cylindrical surface 25.

A clutch release bearing 28 is connected to the movable member 24 of the actuator. The clutch release bearing 28, which is adapted for the snap-fitting engagement already mentioned, comprises a ball bearing having an outer ring 29 which is located axially on the movable member 24, with automatic centring means of the axial spring type as can be seen in FIG. 1. The inner ring of this bearing is extended axially beyond the movable member 24 of the actuator, so as to define an actuating element 30 which has on its outer periphery a transverse shoulder 31, by means of which it is able to cooperate in a hooked relationship with the coupling member 20.

Finally, the declutching device 10 also includes preloading means 32 which permanently bias the movable member 24 of the hydraulic actuator 11 towards its retracted or withdrawn position with respect to the fixed member 23; and retaining means 33 which, as can be seen in FIG. 1, are adapted so as to be able to retain the movable member 24 in its extended position shown in FIG. 1.

The preloading means 32 in this example comprise a spring 34, which bears on the base of an annular cup 35 which is carried axially on the fixed member 23 of the actuator, and which bears on the base of a second annular ring 36 which is itself carried axially on the movable member 24. The first annular cup 36 is fixed to a mounting plate 37 which bears axially on the rear of the fixed member 23 of the hydraulic actuator 11, between the fixed member 23 and the casing 17 of the gearbox. In addition, the mounting plate 37 is located circumferentially on the fixed member 23, for example by a pin (not shown), or by crimping.

In the present example the annular cup 35 is integral with a cylindrical sleeve 38, which is engaged with the mounting plate 37 by means of lugs 39. The annular cup 36 bears on a resilient split ring 40 which is engaged in a groove formed in the movable member 24 of the actuator.

The retaining means 33 comprise a locking ring 42 which is resiliently deformable in the radial direction. The locking ring 42 is disposed in a groove 43 formed in the movable member 24 of the hydraulic actuator 11, and is precompressed so as to bias it radially in such a way that it tends to escape from the groove 43. In the present example the locking ring 42 is made of round wire, being locally open radially by means of a slot 44 (see FIG. 1) to give it its resilient deformation capability.

Figure 3:
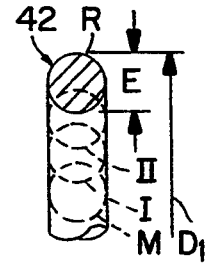
FIG. 3, which is on the same scale as FIG. 2 and which corresponds with the latter, is a partial view in axial cross section of the locking ring employed in the declutching device in accordance with the invention, the ring being shown in FIG. 3 in its free or relaxed state.

If E is the thickness, that is to say the diameter of the right cross section seen in FIG. 3, of the locking ring 42, and if D1 is its overall diameter in the relaxed configuration R shown in full lines in FIG. 3, then the diameter D1 is very much greater than the diameter D2 of the cylindrical interface surface 25 of the fixed member 23 of the actuator.

In the present case the groove 43 is formed as a recess in a surface 45 of the movable member 24 of the actuator. This surface 45 is complementary to the cylindrical interface surface 25, with both these surfaces 45 and 25 having a common diameter D2, subject to a sliding clearance between them. The width L1 of the groove 43 is at least equal to the thickness E of the sealing ring 42, and both flanks of the groove 43 are generally straight and radial, for abutment against the sealing ring 42 in one axial direction, and for driving engagement with the ring 42 in the opposite axial direction.

However, for a three-point support of the sealing ring 42 on its transverse cross section, the outer one of the flanks of the groove 43, that is to say the one lying axially closer to the clutch 12 (i.e. on the left hand side in FIG. 2), is in this example formed with a chamfer extending along its free edge.

Figure 2:
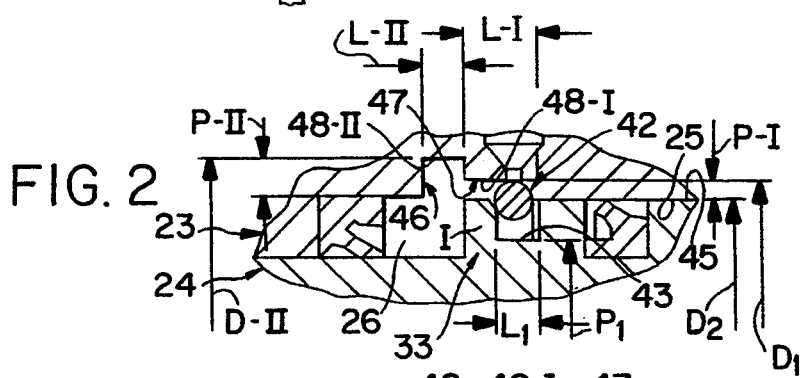
FIG. 2 s a partial view in axial cross section, repeating on a larger scale the detail contained within the broke line II in FIG. 1.

A further groove 46, corresponding with the groove 43 in the movable member 24, is formed as a recess in the cylindrical interface surface 25 of the fixed member 23. As can be seen in FIG. 2, the groove 46 has a stepped base 47 comprising at least two steps 48-I, 48-II, of different diameters and offset from each other axially. The first step 48-I will be referred to here as a retention step, defining a corresponding free radial depth P-I measured from the cylindrical surface 25. This depth P-I is smaller than the thickness E of the sealing ring 42. The second step 48-II will be referred to here as a release step, defining a free radial depth P-II measured from the cylindrical surface 25. This depth P-II is at least equal to the thickness E, and is preferably greater than the latter. Preferably, the depth P-I of the retention step is of the order of one half of the thickness E of the sealing ring 42. It will be noted that the retention step is the innermost one of these two steps in the groove 46, i.e. on the right hand side in the drawings. In other words it lies beyond the release step 48-II in the direction of the free end of the movable member 24, and thus in the direction towards the clutch 12.

In the present case, since the fixed member 23 of the actuator is radially outside the movable member 24, the diameter D-I of the retention step 48-I is smaller than the diameter D-II of the release step 48-II.

If the axial width L-I of the retention step 48-I can have any desired value, though it is preferably greater than the thickness E of the sealing ring 42 as mentioned above and as shown in the drawings, then the width L-II of the release step 48-II is at least equal to the thickness E.

In this example the groove 46 in the fixed member 23 of the actuator is formed in a portion of the cylindrical interface surface 25 of the fixed member which is also the portion of that surface that partly delimits the control chamber 26.

The depth $P_1$ of the groove 43 in the movable member 24, measured from its surface 45, is at least equal to the thickness E of the sealing ring 42.

Thus, the sealing ring 42 may be fitted entirely into the groove 43 during the manufacture of the declutching device 10. As is indicated in broken lines in FIG. 3, the sealing ring 42 then has a configuration M, under elastic precompression, with a minimum diameter which is equal to the diameter D2 of the cylindrical surface 25 of the fixed member 23.

The movable member 24 of the hydraulic actuator 11 carries the sealing ring 42 with it as it is displaced towards its extended position shown in FIG. 1, this displacement taking place against the action of the preloading means 32. When the sealing ring 42 comes into line with the retention step 48-I of the groove 46 in the fixed member 23, it then tends to escape from the groove 43 in the movable member 24 due to its own precompression. However, since the free depth P-I defined by the retention step is smaller than the thickness E of the sealing ring, the latter is forced to remain at least partially engaged in the groove 43 as shown in FIGS. 1 and 2. It now has a first intermediate configuration I (FIG. 3), with a diameter D-I indicated in broken lines. In this configuration, the sealing ring 42, interposed between the movable member 24 and the fixed member 23 and aligned with the cylindrical surface 25 of the latter, retains the movable member 24 in its extended position, by being wedged against the chamfer of the outer (left hand) flank of the groove 43 in the movable member 24 and the inner flank of the groove 46 in the fixed member 23.

The movement of the movable member 24 to its extended position may equally well be carried out by the manufacturer of the declutching device 10, or by the vehicle manufacturer. During assembly by the vehicle manufacturer, the two units 16P and 16S are moved axially towards each other in order to obtain the required snap-fitting. Thus the declutching device 10 is moved with respect to the clutch 12, provided that the movable member 24 of the hydraulic actuator is in its extended position as shown in FIG. 1. This brings the actuating element 30 of the clutch release bearing 28 into axial engagement in the coupling member 20 of the clutch 12, by virtue of a temporary elastic deformation of the coupling member 20. During the course of this relative axial movement, and provided of course that it is great enough, the coupling member 20 passes over the shoulder 31 in the actuating element 30 of the clutch release bearing 28, so as to complete the required snap-fitting. Here, in FIGS. 1 and 2, it even extends beyond the shoulder 31, having regard to the axial amplitude of the relative axial movement carried out.

Once snap-fitting has taken place, a momentary relative axial movement in the opposite direction is applied to the units 16P and 16S, so as to move them once again very slightly further apart. After any clearance that may be present in FIG. 1 has been taken up, the coupling member 20 comes into abutment against the shoulder 31 of the actuating element 30 of the clutch release bearing 28.

Figure 4A:
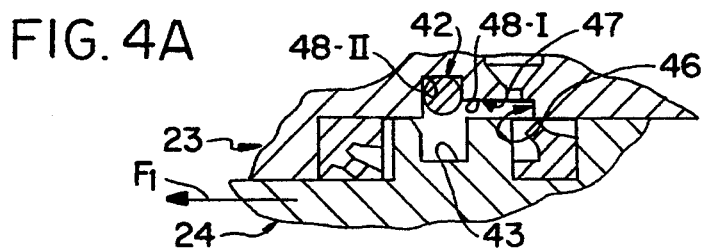
FIGS. 4A and 4B are partial views in axial cross section similar to FIG. 2, but showing two successive phases in the release of the movable member of the hydraulic actuator by the said locking ring.

If the relative reverse axial movement between the units 16P and 16S is then continued, the movable member 24 of the hydraulic actuator 11 is displaced axially in an outward direction (i.e. to the left in FIG. 1) with respect to the fixed member 23 of the actuator, as indicated by the arrow F1 in FIG. 4A. Then, when the locking ring 42, driven by the movable member 24, reaches a position in which it is in line with the release step 48-II in the base 47 of the groove 46 in the fixed member 23, it will automatically expand outwardly into engagement with the release step by virtue of its own elastic precompression.

Having regard to the free depth P-II defined by the release step 48-II, the locking ring 42 thus escapes completely from the groove 43 in the movable member 24, and this releases the latter. The ring 42 then has a second intermediate configuration II, again indicated in broken lines in FIG. 3. Its overall diameter D-II is then greater than the diameter D-I of its previous intermediate configuration I. It should be noted that this second intermediate configuration may in practice be the same as the relaxed configuration R.

Figure 4B:
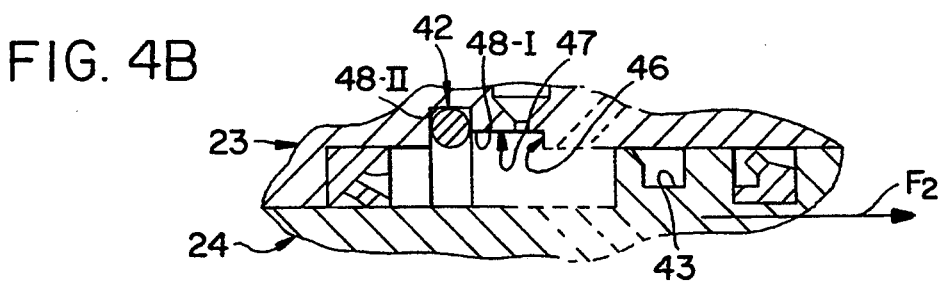

Once the movable member 24 of the hydraulic actuator 11 has been released in the manner just described, while remaining in hooked relationship on the coupling member 20, it is then free to be displaced into the fixed member 23 as indicated by the arrow F2 in FIG. 4B (once the two units 16P and 16S are no longer undergoing relative axial movement away from each other). This movement of the movable member 24 into the fixed member 23 is achieved for example under the biassing influence of the preloading means 32, or by virtue of an axial force resulting from injection of hydraulic fluid under pressure into the control chamber 26.

It will be appreciated that, for the snap-fitting action obtained, there is no need to exert any axial force other than that which is necessary to engage the coupling member 20 on the actuating element 30 of the clutch release bearing 28. It will also be understood that the snap-fitting action takes place systematically and without any other operation.

It will be appreciated, in addition, that the declutching device 10, and the method described above, are very easy to control once the snap-fitting engagement has been achieved.

The present invention is of course not limited to the particular embodiment described above and shown in the drawings, but it embraces all possible embodiments, especially as regards the coupling member. In this connection, as described in the French patent specification FR 2 304 826A, all the various embodiments described in that document being applicable to an arrangement in accordance with the present invention, the coupling member may be carried by the actuating element of the clutch release bearing instead of being part of the thrust means of the clutch itself.

What is claimed is:

1. A declutching device for snap-fitting coupling to a clutch of the pull-off type, the declutching device comprising an hydraulic actuator which itself comprises: a movable member; a fixed member having a cylindrical interface surface mounting said movable member for sliding movement along said interface surface between an extended position and a retracted position with respect to said fixed member, said fixed and movable members being in piston and cylinder relationship with each other and defining a control chamber between them; preloading means coupled with said movable member for biassing the latter permanently towards its said retracted position; and retaining means disposed operatively between said fixed and movable members for retaining said movable member in its said extended position, wherein said retaining means comprise a radially resiliently deformable locking ring, said movable member defining a first groove for containing said locking ring under precompression which biases said the locking ring to escape from said first groove, said fixed member defining a second groove recessed into said cylindrical interface surface, said second groove corresponding to said first groove and having a stepped base defining at least a first step and a second step, of different diameters and offset axially from each other, said first step being a retention step defining a first free radial depth from said cylindrical interface surface, said second step being a release step defining a second free radial depth from said cylindrical interface surface, said locking ring defining a thickness thereof, said first free depth being smaller than said thickness, and said second free depth being at least equal to said thickness.

2. The declutching device according to claim 1, wherein said movable member of the actuator has a free end for snap-fitting engagement with a clutch, said release step being closer to said free end than said retention step.

3. The declutching device according to claim 1 in which said movable member of the actuator is mounted within said fixed member thereof, and wherein said first diameter is smaller than said second diameter.

4. The declutching device according to claim 1, in which said cylindrical interface surface includes a surface portion partly defining said control chamber, said second groove being formed in said surface portion.

5. The declutching device according to claim 1, wherein said first groove has a depth at least equal to said thickness of said locking ring.

* * * * *